March 26, 1946.                E. H. LAND                2,397,273
                               RANGE FINDER
                            Filed March 2, 1943
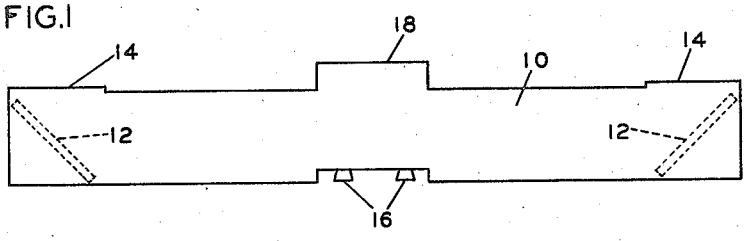
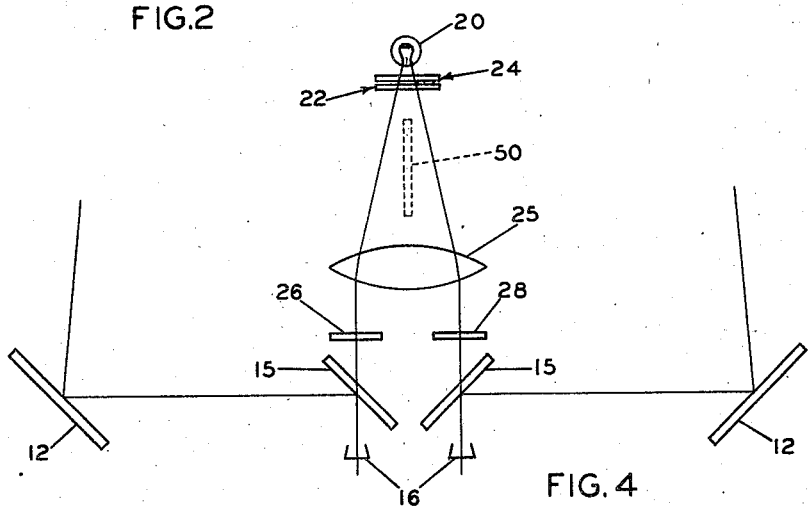
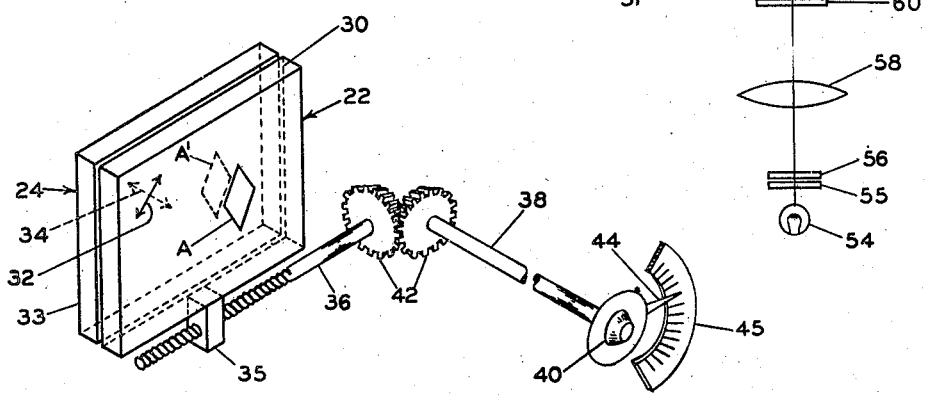
Edwin H. Land
INVENTOR.
BY Donald L. Brown
Attorney Patented Mar. 26, 1946

2,397,273

UNITED STATES PATENT OFFICE 2,397,273

RANGE FINDER

Edwin H. Land, Cambridge, Mass., assignor to Polaroid Corporation, Cambridge, Mass., a corporation of Delaware Application March 2, 1943, Serial No. 477,708

9 Claims. (Cl. 88—2.6)

This invention relates to a new and improved range finder and reticle system therefor.

It is one object of the invention to provide a new and improved range finder comprising means for impressing optical indicia upon the field of view and comprising also means for bringing said indicia into apparent coincidence with the plane of an object in said field and thereby computing the distance of said object from the observer.

Another object is to provide a range finder of the above type wherein the optical indicia are produced by means of a pair of reticle marks positioned in side-by-side relation in the optical system of the device, wherein means are provided for insuring that each eye of the observer see only one of said reticle marks, thereby giving a stereoscopic effect to said indicia, and wherein means are provided for producing and controlling relative lateral motion of said reticle marks to cause said stereoscopic indicia to appear to move with respect to the field of view.

A further object is to provide a range finder of the above characteristics wherein light-polarizing means are used to insure that each eye of the observer see only one of said reticle marks, and particularly wherein each of said reticle marks comprises a dichroic light-polarizing image having its axis perpendicular to the axis of the light-polarizing image constituting the other reticle mark.

Additional objects and advantages will in part appear and in part be pointed out in the course of the following description of one or more embodiments of the invention, which are given as non-limiting examples, in connection with the accompanying drawing, in which:

Figure 1 is a plan view of a housing suitable for a range finder constituting an embodiment of the invention;

Fig. 2 illustrates diagrammatically and in plan the optical elements employed in one embodiment of the invention;

Fig. 3 is an enlarged diagrammatic view in perspective, partly broken away, illustrating certain details of apparatus suitable for use in combination with the optical system shown in Fig. 2 for producing and controlling the apparent position upon the field of the indicia mentioned heretofore; and Fig. 4 is a side view similar to Fig. 2, illustrating diagrammatically a modification of the invention.

In the form of the invention illustrated in the drawing, housing 10 of any desired size and shape is provided with a pair of mirrors or other reflecting surfaces 12 adapted to receive light from in front of the instrument through the windows or apertures at 14. This arrangement serves both to provide an effectively enlarged interocular distance or increased stereoscopic effect, and also to limit the field of view to an area substantially in front of the instrument. Associated with mirrors 12 is a pair of transparent mirrors 15 each of which is adapted to receive light from one of mirrors 12 and to reflect it toward one of eyepieces 16.

An observer employing this range finder will look simultaneously through both of eyepieces 16 with the result that his right eye will receive light from right-hand mirrors 12 and 15, and his left eye will simultaneously receive light from left-hand mirrors 12 and 15. It is to be understood that mirrors 15 and mirrors 12 should be so positioned as to enable an observer employing the instrument to see substantially the same field with each eye. Such a structure, except for the use of transparent mirrors 15 instead of wholly reflecting surfaces, is standard in the construction of range finders of the class of the present invention. Its effect and purpose is to increase the effective interocular distance of the observer by the distance between mirrors 12, and thus to increase considerably the stereoscopic acuity of his vision as applied to the field.

The form of an indicia-forming system suitable for use in the invention is illustrated in detail in Figs. 2 and 3, and may conveniently be located within an extended portion 18 of housing 10. It comprises a light source 20 of any desired type, a pair of reticles 22 and 24 of particular characteristics described in detail hereinafter, a relatively large lens 25 or other device for collimating the rays emanating from source 20 and traversing reticles 22 and 24, and a pair of light-polarizing elements 26 and 28. The term "reticle," as it is used herein and in the claims, is to be understood as having the meaning commonly accorded thereto in the range finder art, and it is to be considered as including any means for producing visible indicia such, for example, as a line, a dot, or a circle or other figure in the optical system of the instrument.

In the preferred embodiment of the present invention, each of reticles 22 and 24 comprises a dichroic light-polarizing image having its transmission axis substantially perpendicular to the axis of the image comprising the other of said pair of reticles. These images may be produced in any way known to the art. For example, reticle 22 may comprise a sheet 30 of a suitable transparent hydrophilic material, such as polyvinyl alcohol, having the molecules on at least one surface thereof predeterminedly oriented as indicated by arrow 32, and having a suitable mark A on said surface by means of any suitable dichroic dye or stain, such for example as a solution containing iodine and an iodide. Reticle 24 may in turn comprise a similar plastic sheet 33 having the molecules on at least one surface thereof oriented at right angles to the molecules of sheet 32, as illustrated by arrow 34, and having a corresponding mark A' reproduced on said surface in the same manner as mark A on sheet 30. Preferably said marks will be on the adjacent faces of sheets 30 and 33 in order that they may lie substantially in the same plane. It will be understood that said marks constitute respectively the right- and left-eye images of a stereoscopic pair, the function of which in the instrument will now be explained.

Reticles 22 and 24 are positioned within the instrument in such manner that the reticle marks thereon lie substantially within the focal plane of lens 25. Polarizing elements 26 and 28 function as analyzers to insure that each eye of the observer see only one of said reticles. In the arrangement shown in Fig. 3, reticle 22 will form the left-eye image and reticle 24 will form the right-eye image. Polarizer 26, therefore, will be positioned with its transmission axis parallel to arrow 34, and polarizer 28 will be positioned with its transmission axis parallel to arrow 32. Thus, when an observer looks through eye-pieces 16, his right eye will see only an image of reticle 24 and his left eye will see only an image of reticle 22. He will therefore fuse said two images to form a stereoscopic image, which will appear superimposed upon the field seen by means of mirrors 12 and 15, and its apparent distance in the field from the instrument will depend upon the lateral distance between marks A and A'.

It should be understood that reticles 22 and 24 may take many forms. For example, in a preferred case, marks A and A' may comprise non-polarizing outlines in otherwise uniformly light-polarizing sheets, and in this case the stereoscopic reticle image will apear as an outline of light superimposed on the field. Another example may comprise the converse of this case, with said marks formed as light-polarizing outlines in other non-polarizing sheets, and in this case the stereoscopic image will appear as a black outline superimposed upon the field. In either of said examples, said marks may comprise solid areas rather than outlines, and many further alternatives will be apparent to those skilled in the art.

It will be apparent that so long as the physical relation between reticle marks A and A' remains the same, the stereoscopic reticle image will appear to lie at the same distance from the instrument. There are, therefore, preferably provided means for varying the distance laterally between said marks and thereby altering the apparent distance of said stereoscopic image from the instrument, together with means for translating said variation to a measurement of said apparent distance.

Reticles 22 and 24 are mounted in any suitable manner permitting relative lateral movement. For example, nut 35 is secured in any suitable manner to one of said reticles, for example, reticle 22, and is enlarged by threaded shaft 36, which may in turn be coupled with shaft 38 by means of gears 42. Shaft 38 may extend to a position outside housing 10 where a knob 40 may be readily manipulated by the operator of the instrument. It will, of course, be understood that shafts 36 and 38 rotate without lengthwise motion.

It will be seen that with the above arrangement, as the operator rotates knob 40, reticle 22 will move laterally with respect to reticle 24 and will thereby cause mark A to move with respect to mark A'. This will in turn cause the stereoscopic image formed by the two images to appear to move in space towards or away from the observer. When said marks are directly superimposed, the stereoscopic image formed thereby will appear to lie at infinity, and as reticle 22 moves to the right in the drawing, said stereoscopic image will appear to move towards the observer.

The relation between the apparent position of the reticle image and the field depends largely upon the angular relation of mirrors 12 and 15 and upon the base line of the instrument, i. e. the distance between mirrors 12. If mirrors 15 are at right angles to each other and parallel to their associated mirrors 12, the reticle mark will appear to lie at infinity when marks A and A' are directly superimposed. If, however, mirrors 15 are at right angles to each other and mirrors 12 are at an angle of less than 90 degrees to each other, or vice versa, the reticle image will appear to lie nearer in space than infinity when marks A and A' are directly superimposed, and will appear to move still nearer as the reticle moves to the right in the drawing. Similarly, if reticle 22 moves to the left in the drawing from the position of direct superimposition of the two marks, the stereoscopic image will appear to move further away from the instrument.

Fig. 3 illustrates scale means adapted to indicate the range of the apparent position of the reticle image, said means comprising pointer 44 fixed to knob 40 and cooperating with scale 45 mounted in any suitable way on or within housing 10. Scale 45 may read in any desirable unit of measurement, for example yards, and should be so adjusted with respect to pointer 44 that the range opposite the pointer will be a maximum when reticle 22 is at the limit of its travel to the left in Fig. 3, and will be a minimum when said reticle is at the limit of its travel to the right in Fig. 3. It will be understood that the calibration of scale 45 is determined both by the base line of the instrument and by the angular relations of mirrors 12 and 15. It will also be apparent that there may advantageously be a suitable vernier system between knob 40 and shaft 38 and/or pointer 44 in order to cause relatively slight motion of reticle 22 and pointer 44 with relatively greater rotation of knob 40, thus making it possible to obtain a more sensitive scale.

In using the above described embodiment of the invention, the observer first preferably adjusts the range finder so that the stereoscopic reticle image is substantially in line with an object in the field of view whose range it is desired to determine. Said image will in all probability appear to be in a different plane from said object, either in front of or behind it in space. The operator then turns knob 40 until said image appears to lie in the same plane as the object whose range is being measured, and he may then read said range directly from scale 45.

It is to be understood that the present invention is not limited to the foregoing embodiment thereof, but that on the contrary many modifications may be made within the principles of the invention and without departing from the scope thereof. In particular, any of many forms of reticle systems may be used. The above-described embodiment utilizing light-polarizing material is preferred by reason of the ease of operation thereof, but the use of light-polarizing material is not essential to the invention. For example, reticles 22 and 24 may instead comprise opaque marks, for example vertical lines, on transparent plates or sheets, in which case polarizers 26 and 28 may be eliminated and a suitable septum 50 or similar element may be employed to insure that each eye of the observer see only one of said reticles. Alternatively, a pair of relatively movable light sources, such for example as a pair of illuminated line filaments, may be substituted for light source 20, in which case reticles 22 and 24 and polarizers 26 and 28 may be eliminated, but septum 50 will preferably be employed. With any of these modifications of the reticle system, modifications in the control apparatus shown in Fig. 3 may be necessary, but such modifications and changes will be apparent to those skilled in the art and are to be construed as coming within the scope hereof.

To a considerable extent the construction of the range finders of the present invention is determined by the purpose for which they are intended. For example, mirrors 12 and 15 are used as illustrated in Figs. 1 and 2 for the purpose of increasing the range of the instrument and its accuracy at increased ranges. However, this construction may be modified if the instrument is designed for use at relatively shorter ranges, i. e. of the order of one hundred yards or less. For such short ranges it may be desirable to rely only upon the human interocular, and Fig. 4 illustrates diagrammatically a modification of the invention suitable for such use. One eye of the observer is indicated at 51 as viewing the field through a single transparent mirror 52, and the reticle system comprises a light source 54, reticles 55 and 56, a pair of light-polarizing elements 60 which polarize light oppositely, only one element of the pair of elements 60 being shown in Fig. 4, and lens 58. Many other modifications will doubtless be apparent to those skilled in the art and are to be construed as coming within the scope of the invention.

Since certain changes may be made in the above device, and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. In a range finder, in combination, a pair of reticles providing right-eye and left-eye images defined by light-polarizing material, the transmission axis of the material defining one of said images being substantially perpendicular to that of the material defining the other said image, means for superimposing said images upon the field of view, light-polarizing means for substantially blocking from each eye of an observer that image intended to be seen by the other eye, means for altering the lateral displacement of said reticles with respect to each other, and scale means responsive to said last-mentioned means for measuring the distatnce from said range finder to the apparent position in the field of view of the stereoscopic image formed by said reticle images.

2. In a range finder, in combination, means for increasing the effective interocular of an observer, a pair of reticles providing right-eye and left-eye images defined by light-polarizing material, the transmission axis of the material defining one of said images being substantially perpendicular to that of the material defining the other said image, means for superimposing said images upon the field of view, light-polarizing means for substantially blocking from each eye of an observer that image intended to be seen by the other eye, and means for altering the lateral displacement of said reticles with respect to each other.

3. In a range finder, in combination, a pair of reticles providing right-eye and left-eye images defined by light-polarizing material, the transmission axis of the material defining one of said images being substatntially perpendicular to that of the material defining the other said image, means for superimposing said images upon the field of view, means for substantially collimating the light carrying said images, light-polarizing means for substantially blocking from each eye of an observer that image intended to be seen by the other eye, and means for altering the lateral displacement of said reticles with respect to each other.

4. In a range finder, in combination, a pair of reticles providing right-eye and left-eye images defined by light-polarizing material, the transmission axis of the material defining one of said images being substantially perpendicular to that of the material defining the other said image, transparent mirror means for superimposing said images upon the field of view, light-polarizing means for substantially blocking from each eye of an observer that image intended to be seen by the other eye, and means for altering the lateral displacement of said reticles with respect to each other.

5. In a range finder, in combination, means for increasing the effective interocular of an observer, a pair of reticles providing right-eye and left-eye images defined by light-polarizing material, the transmission axis of the material defining one of said images being substantially perpendicular to that of the material defining the other said image, transparent mirror means for superimposing said images upon the field of view, light-polarizing means for substantially blocking from each eye of an observer that image intended to be seen by the other eye, and means for altering the lateral displacement of said reticles with respect to each other.

6. In a range finder, in combination, a pair of reticles providing right-eye and left-eye images defined by light-polarizing material, the transmission axis of the material defining one of said images being substantially perpendicular to that of the material defining the other said image, a collimating lens positioned between said reticles and an observer, said reticles being positioned substantially in the focal plane of said lens, means for superimposing said images upon the field of view, light-polarizing means for substantially blocking from each eye of an observer that image intended to be seen by the other eye, and means for altering the lateral displacement of said reticles with respect to each other.

7. In a range finder, in combination, means for increasing the effective interocular of an observer, a pair of reticles providing right-eye and left-eye images defined by light-polarizing material, the transmission axis of the material defining one of said images being substantially perpendicular to that of the material defining the other said image, a collimating lens positioned between said reticles and an observer, said reticles being positioned substantially in the focal plane of said lens, means for superimposing said images upon the field of view, light-polarizing means for substantially blocking from each eye of an observer that image intended to be seen by the other eye, and means for altering the lateral displacement of said reticles with respect to each other.

8. In a range finder, in combination, means for increasing the effective interocular of an observer, a pair of reticles providing right-eye and left-eye images defined by light-polarizing material, the transmission axis of the material defining one of said images being substantially perpendicular to that of the material defining the other said image, a collimating lens positioned between said reticles and an observer, said reticles being positioned substantially in the focal plane of said lens, means for superimposing said images upon the field of view, light-polarizing means for substantially blocking from each eye of an observer that image intended to be seen by the other eye, means for altering the lateral displacement of said reticles with respect to each other, and scale means responsive to said last-mentioned means for measuring the distance from said range finder to the apparent position in the field of view of the stereoscopic image formed by said reticle images.

9. In a range finder, in combination, binocular means for viewing an object to be ranged, a pair of reticles providing right-eye and left-eye images defined by light-polarizing material, said reticles being arranged with respect to each other so that light polarized by one reticle is polarized in a sense opposite to light polarized by the other reticle, beam-joiner means in the path of rays proceeding from said object and in the path of rays proceeding from said reticles for joining said rays and directing the combined rays towards the eyes of an observer using the range finder, light polarizing means in the path of rays proceeding from said reticles for substantially blocking from each eye of the observer that image intended to be seen by the other eye, and means for altering the lateral displacement of said reticles with respect to each other.

EDWIN H. LAND.